United States Patent
Liu et al.

(10) Patent No.: US 9,825,817 B2
(45) Date of Patent: Nov. 21, 2017

(54) NETWORK CONFIGURATION AUTO-DEPLOYMENT

(71) Applicant: HEWLETT PACKARD ENTERPRISE DEVELOPMENT LP, Houston, TX (US)

(72) Inventors: Hao Liu, Beijing (CN); Yumei Zhang, Beijing (CN); Lihao Cheng, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 115 days.

(21) Appl. No.: 14/769,052

(22) PCT Filed: Apr. 21, 2014

(86) PCT No.: PCT/CN2014/075782
§ 371 (c)(1),
(2) Date: Aug. 19, 2015

(87) PCT Pub. No.: WO2014/173263
PCT Pub. Date: Oct. 30, 2014

(65) Prior Publication Data
US 2016/0006623 A1    Jan. 7, 2016

(30) Foreign Application Priority Data

Apr. 25, 2013   (CN) .......................... 2013 1 0148969
Aug. 23, 2013   (CN) .......................... 2013 1 0372681

(51) Int. Cl.
*H04L 12/24*   (2006.01)
*H04L 12/26*   (2006.01)

(52) U.S. Cl.
CPC .......... *H04L 41/12* (2013.01); *H04L 41/0806* (2013.01); *H04L 41/0886* (2013.01);
(Continued)

(58) Field of Classification Search
None
See application file for complete search history.

(56) References Cited

U.S. PATENT DOCUMENTS 6,336,138 B1   1/2002   Caswell et al.
6,625,643 B1   9/2003   Colby et al.
(Continued)

FOREIGN PATENT DOCUMENTS

CN   1453956   11/2003
CN   1866963   11/2006
(Continued)

OTHER PUBLICATIONS

"Configuring Network Resources for IBM BladeCenter Blade Servers", IBM, Nov. 20, 2008, http://pic.dhe.ibm.com/infocenter/director/v6r1x/index.jsp?topic=/director.systemx_bc_6.1/fqm0_t_bc_configuring_bladecenter_network.htmi.
(Continued)

*Primary Examiner* — Faruk Hamza
*Assistant Examiner* — Alan Lindenbaum
(74) *Attorney, Agent, or Firm* — Hewlett Packard Enterprise Patent Department

(57) ABSTRACT

According to an example of the present disclosure, a service template providing a service may be found according to type of the service. A resource zone matching the service template may be found from a resource pool. A network resource matching a service unit in the service template may be found from the resource zone. A network parameter configured for the service unit may be sent to the network resource.

19 Claims, 12 Drawing Sheets

(52) U.S. Cl.
CPC ........ *H04L 41/145* (2013.01); *H04L 41/5041* (2013.01); *H04L 41/5048* (2013.01); *H04L 41/5054* (2013.01); *H04L 41/5058* (2013.01); *H04L 43/0876* (2013.01); *H04L 41/0893* (2013.01)

(56) References Cited

U.S. PATENT DOCUMENTS

| | | | |
|---|---|---|---|
| 6,766,364 | B2 | 7/2004 | Moyer et al. |
| 7,352,853 | B1 | 4/2008 | Shen |
| 7,558,195 | B1 | 7/2009 | Kuo |
| 7,792,989 | B2 | 9/2010 | Toebes et al. |
| 7,979,552 | B1 | 7/2011 | Saraiya et al. |
| 8,565,118 | B2 | 10/2013 | Shukla et al. |
| 2003/0135596 | A1 | 7/2003 | Moyer et al. |
| 2006/0075102 | A1 | 4/2006 | Cupit |
| 2006/0265739 | A1 | 11/2006 | Bhaskaran |
| 2007/0073697 | A1 | 3/2007 | Woods |
| 2008/0312986 | A1 | 12/2008 | Braun et al. |
| 2009/0177727 | A1 | 7/2009 | Radia et al. |
| 2010/0110933 | A1 | 5/2010 | Wilcock et al. |
| 2010/0312612 | A1 | 12/2010 | Carr et al. |
| 2011/0106950 | A1 | 5/2011 | Schlack |
| 2011/0213886 | A1* | 9/2011 | Kelkar .......... G06F 9/5072 709/226 |
| 2011/0228669 | A1 | 9/2011 | Lei et al. |
| 2011/0231552 | A1 | 9/2011 | Carter et al. |
| 2011/0270721 | A1 | 11/2011 | Kusterer |
| 2011/0296021 | A1 | 12/2011 | Dorai et al. |
| 2011/0321033 | A1 | 12/2011 | Kelkar et al. |
| 2012/0072597 | A1 | 3/2012 | Teather et al. |
| 2012/0246646 | A1 | 9/2012 | Bakman |
| 2012/0311120 | A1 | 12/2012 | Yasuda et al. |
| 2013/0124708 | A1 | 5/2013 | Lee |
| 2013/0138806 | A1 | 5/2013 | Gohad et al. |
| 2013/0138812 | A1 | 5/2013 | Assuncao et al. |
| 2013/0254374 | A1 | 9/2013 | Bogdany et al. |
| 2014/0033268 | A1 | 1/2014 | Julisch et al. |
| 2016/0006623 | A1 | 1/2016 | Liu |

FOREIGN PATENT DOCUMENTS

| | | |
|---|---|---|
| CN | 1881976 | 12/2006 |
| CN | 1901465 | 1/2007 |
| CN | 101923501 | 12/2010 |
| CN | 101925045 | 12/2010 |
| CN | 102082821 | 6/2011 |
| CN | 102273132 | 12/2011 |
| CN | 102315968 | 1/2012 |
| CN | 102340689 B | 2/2012 |
| CN | 102523110 | 6/2012 |
| CN | 102611718 | 7/2012 |
| CN | 102624552 | 8/2012 |
| CN | 102907037 B | 1/2013 |
| CN | 102932279 | 2/2013 |
| CN | 103001892 | 3/2013 |
| CN | 103269282 | 8/2013 |
| EP | 1168880 | 1/2002 |
| JP | 2005-250844 | 9/2005 |
| JP | 2006-209509 | 8/2006 |
| JP | 2008-059346 | 3/2008 |
| JP | 2012-253550 | 12/2012 |
| KR | 10-2011-0046895 | 5/2011 |
| WO | WO-00/57296 | 9/2000 |
| WO | WO-0057296 | 9/2000 |
| WO | WO-2004059540 | 7/2004 |
| WO | WO-2005060161 | 6/2005 |
| WO | WO-2007120663 | 10/2007 |
| WO | WO-2007146368 | 12/2007 |
| WO | WO-2011/032454 A1 | 3/2011 |
| WO | WO-2011032454 | 3/2011 |

OTHER PUBLICATIONS

"Understanding Cisco Unified Computing System Service Profiles", Cisco, Apr. 15, 2010.

International Search Report and Written Opinion dated Jul. 15, 2014, PCT Patent Application No. PCT/CN2014/075782 dated Apr. 21, 2014, The State Intellectual Property Office, P.R. China.

Chen, X. et al., "Resource Virtualization Methodology for On-demand Allocation in Cloud Computing Systems", Service Oriented Computing and Applications, Springer, Jun. 2013, vol. 7, Issue 2, pp. 77-100.

International Search Report and Written Opinion dated Jul. 16, 2014, PCT Patent Application No. PCT/CN2014/075783 dated Apr. 21, 2014, The State Intellectual Property Office, P.R. China.

International Search Report and Written Opinion dated Jul. 9, 2014, PCT Patent Application No. PCT/CN2014/075785 dated Apr. 21, 2014, The State Intellectual Property Office, P.R. China.

Londono et al., "NETEMBED: A Network Resource Mapping Service for Distributed Applications", IEEE, Jan. 24, 2008.

European Patent Office; "Extended European Search Report", 14787547.0, dated Dec. 12, 2016, 9 pages.

Extended European Search Report dated Feb. 15, 2017, EP Patent Application No. 14788690.7 dated Apr. 21, 2014, European Patent Office, 9 pages.

Notice of Allowance, JP Application No. 2015-561935, dated Jul. 5, 2016, pp. 1-3.

Office Action, JP Application No. 2015-561935, dated Mar. 15, 2016, pp. 1-3.

U.S. Office Action dated Mar. 2, 2016, U.S. Appl. No. 14/769,042 dated Aug. 19, 2015, United States Patent and Trademark Office, 15 pages.

\* cited by examiner a service template providing a service is found according to type of a service and a resource zone matching the service template is found from a resource pool — 101A a network resource matching a service unit in the service template is found from the resource zone and a network parameter configured for the service unit is sent to the network resource — 102A

Fig. 1A a network model is generated with network roles — 101B as for each network model, one or multiple service units are applied to the network roles in the network model to generate a service template applied to the network model — 102B network resources of the whole network are discovered, a pooling operation is performed for the discovered network resources, a resource pool is formed with the network resources and the network resources in the resource pool are divided into one or multiple resource zones according to actual networking requirements. Each network resource in the resource pool has a pooling resource merit. — 103B

Fig. 1B

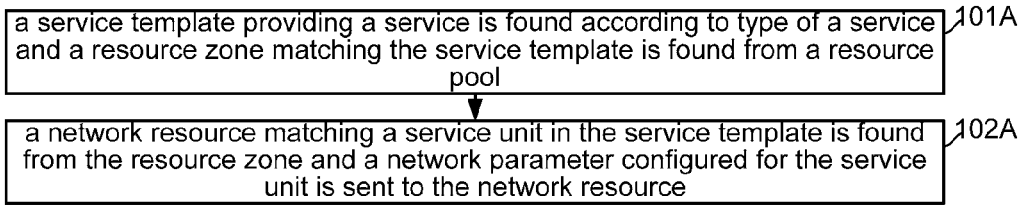

Fig. 2

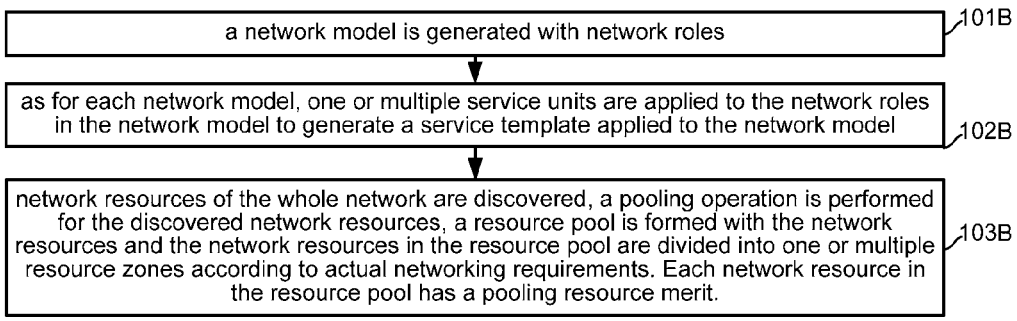

Fig. 3

Service Unit syntax structure

<service unit name> <supertype>
 <PropertyList>
 <ResourceList>
  <Resource>
   <PropertyList>
   <MethodList>
    <Method>
    <param>
  <GlobalMethod>
   <MethdoList>
    <Method>
    <param>

Basic class service unit definition: Port

```
<vObject type=" Port" Dependobject=" Device" shared=" true" >
 <PropertyList>
  <property name=" device_id"     value=" $DEVICE_ID" />
  <property name=" name"          value=" $NAME" />
  <property name=" state"         value=" $STATE" />
  <property name=" speed"         value=" $SPEED" />
  <property name=" acl"           value=" $ACL_LIST" />
 </PropertyList>
 <ResourceList>
  <Resource name=" bandwidth" >
  <PropertyList>
   <property name=" total"     value=" $TOTAL_BANDWIDTH" />
   <property name=" available"  value=" $AVAILABLE_BANDWIDTH" />
  </PropertyList>
   <MethodList type=" bandwidth" >
    <Method name=" lr_bandwidth"    config=" false" >
     <Param name=" cir"  value=" "  type=" basic" />
     <Param name=" cbs"  value=" "  type=" advance" />
    </Method>
    ...
   </MethdoList>
  </Resource>
 </ResourceList>
 <GlobalMethod>
  <MethodList type=" acl" >
   <Method name=" basci_acl "  config=" false"  default=" true" >
    <Param name=" sourceip"   value=" "  type=" basic" />
    <Param name=" type"  value=" permit"  type=" advance" />
   </Method>
   ...
  </MethodList>
 </GlobalMethod>
</vObject>
```

Fig. 6

Extend class service unit definition: Port.LogicalPort

```
<vObjecttype=" LogicalPort" superType=" Port" Dependobject=" Device" shared=" true"
 <PropertyList>
  <property name=" attach_port"    value=" $ATTACH_PORT" />
 </PropertyList>
</vObject>
```

Fig. 7

Extend class service unit definition: Port.LogicalPort. VEPAPort

```
<vObject
type="VEPAPort" superType="LogicalPort" dependobject="EVBswitch"
shared="true">
  <PropertyList>
   <property name="vlan"        value="$VLAN" />
   <property name="vsi_type"    value="$VSI_TYPE" />
   <property name="version"     value="$VERSION" />
   <property name="vnic_mac"    value="$VNIC_MAC" />
  </PropertyList>
</vObject>
```

Fig. 8

Basic class service unit definition: link

```
<vObject type="Link" dependobject="device">
  <PropertyList>
   <property name="name"         value="$NAME" />
   <property name="state"        value="$STATE" />
   <property name="type"         value="$TYPE" />
   <property name="left_dev_id"  value="$LEFT_DEV_ID" />
   <property name="left_port_id" value="$LEFT_PORT_ID" />
   <property name="right_dev_id" value="$RIGHT_DEV_ID" />
   <property name="right_port_id" value="$RIGHT_PORT_ID" />
   <property name="delay"        value="$DELAY" />
   <property name="jitter"       value="$JITTER" />
  </PropertyList>
  <ResourceList>
   <Resource name="bandwidth" >
    <PropertyList>
     <property name="total"     value="$TOTAL_BANDWIDTH" />
     <property name="available" value="$AVAILABLE_BANDWIDTH" />
    </PropertyList>
   </Resource>
  <ResourceList>
</vObject>
```

Fig. 9

Extend class service unit definition: Link.AggrLink

```
<vObject type=" AggrLink" supertype=" Link" dependobject=" Switch"
  <PropertyList>
   <property name=" left_group"      value=" $LEFT_GROUP" />
   <property name=" left_port_list"     value=" $LEFT_PORT_LIST" />
   <property name=" right_group"      value=" $RIGHT_GROUP" />
   <property name=" right_port_list"     value=" $RIGHT_PORT_LIST" />
   <property name=" lb_policy"        value=" $LB_POLICY" />
   <property name=" ls_static"        value=" $LS_STATIC" />
  </PropertyList>
  <MethodList type=" addlink" >
    <Method name=" addlink " config=" false" default=" true" >
     <Param name=" leftport" value=" " type=" basic" />
     <Param name=" rightport" value=" " type=" basic" />
    </Method>
  </MethodList>
</vObject>
```

Fig. 10

Extend class service unit definition: Link.AggrLink.L3AggrLink

```
<vObject type=" L3AggrLink" supertype=" AggrLink" dependobject=" Router.Switch"
  <PropertyList>
   <property name=" routing"     value=" $ROUTING" />
  </PropertyList>
 <MethodList type=" addsubif" >
    <Method name=" addsubif" config=" false" default=" true" >
     <Param name=" ifindex" value=" " type=" basic" />
    </Method>
  </MethodList>
</vObject>
```

Fig. 11

NETWORK CONFIGURATION AUTO-DEPLOYMENT

CLAIM FOR PRIORITY

This application is a national stage filing under 35 U.S.C. §371 of PCT application number PCT/CN2014/075782, having an international filing date of Apr. 21, 2014, which claims the benefit of priority from Chinese Patent Application, No. 201310148969.9, entitled "Network configuration auto-deployment method and device" and filed on Apr. 25, 2013, and Chinese Patent Application, No. 201310372681.X, entitled "Network configuration auto-deployment method and device" and filed on Aug. 23, 2013, the entire content of which is hereby incorporated by reference.

BACKGROUND

With development of network technologies, a traditional physical network is being replaced by a virtual network and a Software Defined Networking (SDN) network. It is a long time to totally replace the traditional physical network with the virtual network and the SDN network. Therefore, in a long time, the traditional physical network, virtual network and SDN network will coexist. It is necessary to effectively and intensively manage the traditional physical network, virtual network and SDN network to implement network interconnection and provide users with network services.

BRIEF DESCRIPTION OF THE DRAWINGS

FIG. 1A is a flow chart illustrating a network configuration auto-deployment method in accordance with an example of the present disclosure;

FIG. 1B is a flow chart illustrating a method for generating a service template and a resource pool in accordance with an example of the present disclosure;

FIG. 2 is a schematic diagram illustrating a network role in accordance with an example of the present disclosure;

FIG. 3 is a schematic diagram illustrating a network model in accordance with an example of the present disclosure;

FIGS. 6 to 8 are schematic diagrams illustrating network parameters of three different kinds of vPorts in accordance with examples of the present disclosure;

FIGS. 9 to 11 are schematic diagrams illustrating network parameters of three different kinds of vLinks in accordance with examples of the present disclosure;

DETAILED DESCRIPTION

Figures 4, 5:
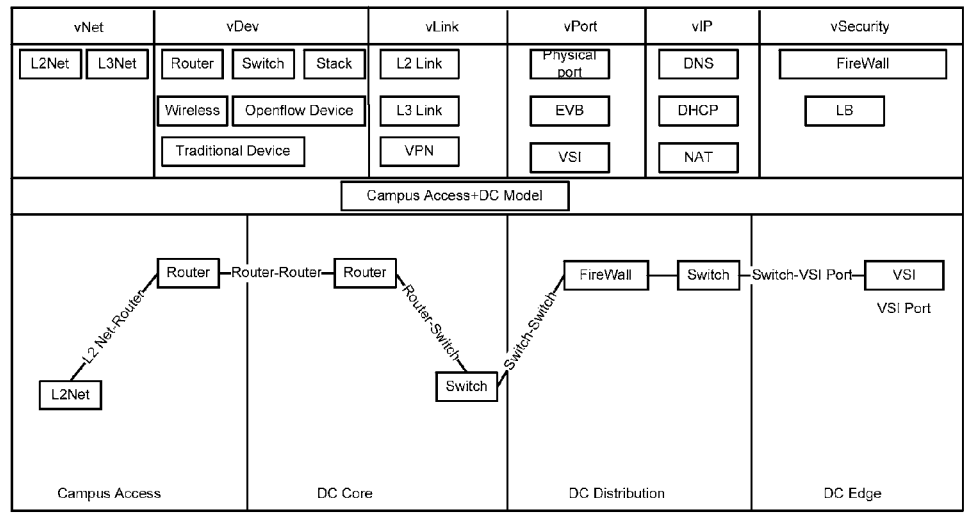
FIG. 4 is a schematic diagram illustrating a service unit in accordance with an example of the present disclosure.
FIG. 5 is a schematic diagram illustrating network parameter structure of a service unit in accordance with an example of the present disclosure.

Network resources may be a collective concept. The network resources may be physical network devices or virtual network devices and capability thereof in a network. Physical network resources may include: a switch, a router, a firewall device, a Load Balance (LB) device, a server, a port and a link, etc. Virtual network resources may include: a virtual device, a vSwitch, a vPort, a network application, bandwidth, throughput, a Virtual Local Area Network (VLAN) and an Internet Protocol (IP) address, etc.

There may be a lot of network roles in the network. When the network is constructed, a user may care for partial of the network roles. For instance, the tenant may not pay attention to a convergence layer. All configurations may be set in a core layer and an access layer. A network model may be a set of the network roles. Different network roles may constitute different network models, which may be suitable for different users.

A process for adding network resources to a resource pool may be called pooling.

A tenant may be a collective concept. The tenant may be a user device using the system or resources. The tenant may have administrative characteristics and service characteristics. The administrative characteristics may include: a name of a tenant, inductions of the tenant and an email of the tenant, etc. The service characteristics may include connection modes which may be used by the tenant, such as LAN access, Virtual Private Network (VPN) access and wireless access.

A connection point may belong to an access resource. The connection point may be a point located at a data center or a campus network and may be an entrance of the data center or the campus network. The connection point may include: multiple physical ports, an IP scope and a VLAN scope.

A network from tenants to a server may be a cross-data center network. In order to conveniently perform service orchestration, a resource zone may be defined. The resource zone may be virtual network classification. The campus network and a data center network may be divided into a zone. Alternatively, the data center may be divided into multiple parts and allocated to multiple zones. Different zones may share a same physical device. The resource zone may be defined according to the network model. Devices may be divided into different network role layers.

The service orchestration may be a core operation of a network service system. A service orchestration operation may be performed for a service unit to generate a service template. Instantiation of a service may be implemented as requested by the tenant. The service orchestration may refine a service requested by the tenant, such as bandwidth, route, access control and different kinds of virtual machines.

The network may be taken as resources and may be managed according to a method for managing the resources. A pooling operation may be performed for the resources in the network, such as a port, an IP address, a VLAN and a regulation. The network may cut into slices to generate resource zones corresponding to service templates. The users may be provided with the resources which have been cut into the slices and the resources in the pool may be globally allocated and monitored to provide the tenants with services.

FIG. 1A is a flow chart illustrating a network configuration auto-deployment method in accordance with an example of the present disclosure. Referring to FIG. 1A, the network configuration auto-deployment method may include following blocks.

In block 101A, a service template providing a service may be found according to type of a service and a resource zone matching the service template may be found from a resource pool.

In block 102A, a network resource matching a service unit in the service template may be found from the resource zone and a network parameter configured for the service unit may be sent to the network resource.

FIG. 1B is a flow chart illustrating a method for generating a service template and a resource pool in accordance with an example of the present disclosure. As shown in FIG. 1B, the method may include following blocks.

In block 101B, a network model may be generated with a network role.

According to an example, the network model may be generated with different network roles. The network roles may be divided according to network locations and functions. For instance, a function of a core layer may be implementing optimized transmission between backbone networks. A convergence layer may connect with an edge access layer and the core layer and provide the edge access layer with functions of convergence, transmission, management and distribution. The edge access layer may directly connect with user devices and may be accessed by the user devices.

According to an example, taking a Data Center (DC) network and Campus Access (CA) network for example, the DC network and CA network may be divided into network roles shown in FIG. 2.

Based on the network roles described above, in this block 101B, the network model may be generated according to the network roles.

Taking the network roles shown in FIG. 2 for example, in an illustrative application scenario of the present example, the process for organizing the network roles in FIG. 2 to generate the network model in FIG. 3 may be described.

In block 102B, as for each network model, one or multiple service units may be applied to the network roles in the network model to generate a service template applied to the network model.

According to an example, the service unit may be a virtual object. The virtual object may be a vNet, a vDev, a vController, a vLink, a vPort, a vIP service, a vSecurity resource, a vHost or a vApp resource. Different service units may provide different services.

The vNet may provide network services, such as, network services in layer-2 and layer-3.

The vDev may provide device services. The vDev may include various kinds of network devices, such as a traditional switch, a router, a wireless device, a stack device and an SDN device in the resource pool.

The vController may be a device for controlling forwarding of a packet. The vController may be a controller in the SDN network or an Access Controller (AC) in the wireless network.

The vLink may provide link services and may be a link in topology structure.

The vPort may provide port services and may be port resources in the resource pool.

The vIP service may provide IP-related services, such as allocating an IP address or parsing a domain name. The vIP service may be a service in the resource pool.

The vSecurity resource may provide security services. The vSecurity may represent a security device or a firewall device in the resource pool.

The vHost may provide host services.

The vApp resource may provide application services.

According to an example, the service unit may be further divided into different sub-classes. As shown in FIG. 4, the vNet may include a vL2Net, a vL3Net, etc. The vDev may include a vRouter, a vSwitch, a vWirelessDev, a vStackDev, such as an Intelligent Resilient Framework (IRF) and/or a Multiple Devices context (MDC) device, a vTraditionalDev and a vOpenflowDev, etc. The vTraditionalDev may include: a vRouter, vSwitch, vWirelessDev and vStackDev, etc.

It should be noted that nine kinds of service units may be listed in this example and a new service unit may be used with development of network technologies.

According to an example, the service unit may be defined with an Extensible Markup Language (XML)/json standard format. Network parameters may be configured for a service unit. The network parameters may include: a network attribute, a network resource list and a method list.

The network attribute may be basic information of the service unit and the network resource of the service unit.

Taking the vPort for example, the attribute may include at least one of an ID of a device, to which the vPort may belong, a name of the port, state and rate of port.

The network resource list may include resources which may be provided by the service unit.

Taking the vPort for example, the resources may include bandwidth. The attributes of the bandwidth may include: available bandwidth and total bandwidth.

The method list may include operation methods supported by the network resources of the service unit. The operation methods may include: a global operation method of the service unit and an operation method for processing each network resource of the service unit.

For example, if the service unit is the vPort, the network parameters of the vPort may include: the network attribute, the network resource list and the method list. The attribute of the vPort may include at least one of an ID of a device, to which the vPort may belong, a name of the vPort, state and rate of the vPort. The network resource list of the vPort may include bandwidth. The attributes of the bandwidth may include: total bandwidth and available bandwidth. The method list of the vPort may include: a method for configuring the bandwidth and a global method of the vPort, etc. There may be multiple methods for configuring the bandwidth, such as, a method for allocating the bandwidth to different tenants. The method for allocating the bandwidth according to the tenants may include: a Peak Information Rate (PIR) and a Committed Information Rate, etc. The global method of the vPort may include Access Control List (ACL) control globally issued for the vPort. The method-related parameters may include basic parameters and advanced parameters. For example, there may be many parameters, such as the CIR/Committed Burst Size (CBS) and PIR/Excess Burst Size (EBS), for controlling the bandwidth. The basic parameters may be used in a simple service and the advanced parameters may be used in a complicated service.

According to an example, in order to implement compatibility of different networks, capabilities of different networks may be taken into consideration when the network parameters of the service unit are defined. For instance, in an illustrative scenario of the present disclosure, the capabilities of the SDN network, virtual network and physical network may be taken into consideration. For example, if the capabilities of the SDN network (the SDN network may be implemented with OpenFLow technologies) are taken into consideration, the core part of the SDN network may be a Flow Table (FT). In an SDN protocol standard, a multi-tuple, such as a switch port, Media Access Control (MAC) address, VLAN, IP address and IP protocol may be taken as matching characteristics of the FT. According to an example, when the service unit is defined, the matching characteristics of the FT defined by the protocol standard may be configured for the service unit, so that the service unit may be compatible with the SDN network.

According to an example, the network parameters of the service unit may be described according to the structure shown in FIG. 5.

FIGS. 6 to 8 are schematic diagrams illustrating network parameters of three kinds of vPorts. FIGS. 9 to 11 are schematic diagrams illustrating network parameters of three kinds of vLinks.

Based on the service unit described above, in this block 102B, different service units may be applied to different network roles of a network model according to a service requested by a tenant to generate a service template applied to the network model. For example, if different service units may be applied to a network model, i.e., a CA+DC model, a service template shown in FIG. 4 and applied to the CA+DC model may be generated. According to an example, the service template may be generated with reference to a practical network. Alternatively, the service template may be generated without referring to a practical network.

It may be seen that in this example, the service template may be formed by at least one service unit. For example, the service template shown in FIG. 4 may be formed by multiple different service units. According to an example, network parameters may be defined for each service unit. The service units in the service template may have the network parameters.

In block 103B, network resources of the whole network may be discovered, a pooling operation may be performed for the discovered network resources, a resource pool may be formed with the network resources and the network resources in the resource pool may be divided into one or multiple resource zones according to actual networking requirements. Each network resource in the resource pool may have a pooling resource indicator.

Each resource zone may correspond to one network model.

According to an example, an actual network may be a network in an operation state. The actual network may be one of or any combination of a physical network, a virtual network and an SDN network. With development of technologies, the example may be applied to other new networks.

The network resources may be divided into the resource zones to more conveniently manage the network. The resource zones may belong to virtual network classification. The virtual network classification may divide different networks, such as DC and CA into the same resource zone. A same network may be divided into multiple resource zones and different resource zones may share a same network device.

According to an example, after the actual network is divided into the resource zones, a network model may be allocated to a resource zone, so that the resource zone may be applied to the network model corresponding to the resource zone.

The method for allocating a network model for each resource zone may include: determining a network model which may at least include a network role, the location and function of which may match those of a network resource in the resource zone from all of the network models and allocating the determined network model to the resource zone.

A corresponding network model may be allocated to each resource zone. A corresponding relationship between the resource zones and the network models may not be limited to the one-to-one corresponding relationship. One network model may correspond to multiple resource zones. That is, multiple resource zones may be applied to the same network model.

After allocating a network model for a resource zone, a network role in the network model corresponding to the resource zone may be allocated to each network resource in the resource zone. A network role may be allocated to the network resource according to the location and function of the network resource in the resource zone.

According to an example, the resource pool may include but not be limited to following five kinds of network resources.

The first kind of network resource may be a connection point resource. The connection point resource may be formed by one or multiple access ports.

The second kind of network resource may be a path resource. The path resource may be an end-to-end path and may be formed by one or multiple links.

The third kind of network resource may be a Load Balance (LB) resource and may be used for load balance.

The fourth kind of network resource may be a firewall resource and may be used for configuring an access strategy.

The fifth kind of network resource may be an application resource and may be used for providing a network application service.

The network resources in the resource pool may have pooling resource indicators. The pooling resource indicators of the five kinds of network resources may be shown in table 1. As for different access modes, such as an LAN access mode, VPN access mode and wireless access mode, the pooling resource indicators of the connection point resource may be different.

TABLE 1

| Type of resources in the resource pool | | Pooling resource indicators | | | |
|---|---|---|---|---|---|
| Connection point resource | LAN access mode | port | VLAN | IP address segment | Bandwidth |
| | VPN access mode | Virtual Forwarding Instance(VFI)/ Virtual Route Forwarding (VRF) Instance | VLAN | IP address segment | Bandwidth |
| | Wireless access mode | Service Set Identifier (SSID) | VLAN | IP address segment | Bandwidth |
| Path resource | | Bandwidth | | | |
| Load Balance (LB) resource | | Virtual server | Port | Throughput | |
| Firewall resource | | Number of concurrent connections | Throughput | Bandwidth | |
| Application resource | | Number of concurrent connections | Number of connections permitted by software | | |

In a large-scale enterprise, hierarchical management may be performed for the network resources by a network administrator or a domain administrator. The network administrator may find the network resources in the whole network via topology and pool the found network resources and constitute a resource pool with the network resources. Each domain administrator of each resource zone may select network resources in the resource pool for constituting the resource zone according to network roles in the network model of the resource zone. The domain administrator may use the network resources, but cannot find the network resources.

In a small enterprise, the network resources may be found in the resource zone by the network administrator via the topology and the resource pool may be formed with the network resources.

The network resources may be found with a following method.

1) a discovery scope of network resources may be determined. For instance, the discovery scope may be a whole network scope or a resource zone.

2) all nodes and links may be found in the discovery scope via topology.

3) resources in a resource pool may be constituted with the nodes and links.

A determination as to whether the nodes need to be pooled and which resources of the nodes may be pooled may be made according to network locations and access situations of the nodes. If the nodes need to be pooled, the resources of the nodes, which may be pooled, may be used for forming one kind or multiple kinds of resources, such as connection point resources and LB resources. The links may be path resources in the resource pool according to devices, ports and bandwidth, etc., associated with the links. The auto-deployment of the network configuration may be completed after the resource pool and the service template are generated.

Figure 12:
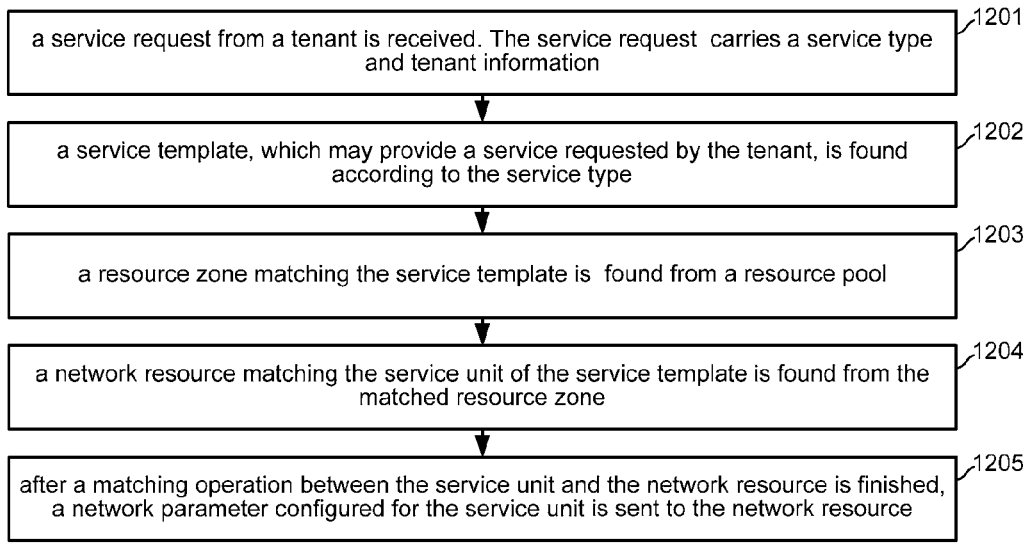
FIG. 12 is a flow chart illustrating a process for auto-deploying network configuration in accordance with an example of the present disclosure.

FIG. 12 is a flow chart illustrating a process for auto-deploying network configuration in accordance with an example of the present disclosure. As shown in FIG. 12, the method may include following blocks.

In block 1201, a service request from a tenant may be received. The service request may carry a service type and tenant information.

In block 1202, a service template, which may provide a service requested by the tenant, may be found according to the service type.

In block 1203, a resource zone matching the service template may be found from a resource pool.

This block 1203 may include: identifying a network model, to which the service template may be applied, searching for a resource zone corresponding to a network model, to which the service template may be applied, from the resource pool and the taking the resource zone as that matching the service template.

In block 1203, one or more than one resource zone may be found. When one resource zone is found, a network resource matching each service unit in the service template may be found from the resource zone. When more than one resource zone is found, in order to enhance a matching rate of the network resources in the resource zone and the service units, one resource zone, which may best match the service template, may be found from the more than one resource zone and a network resource matching each service unit in the service template may be found from the selected resource zone.

One resource zone, which may best match the service template, may be selected from the more than one resource zone according to following parameters.

The resource zone, which may best with the service template, may be selected according to characteristics and connection points of the tenant.

A tenant may be a collective concept. The tenant may have administrative characteristics and service characteristics. The administrative characteristics may include: a name of a tenant, inductions of the tenant and an email of the tenant, etc. The service characteristics may include connection modes which may be used by the tenant, such as an LAN access mode, Virtual Private Network (VPN) access mode and wireless access mode. The service characteristics of the tenant may affect the above matching operation. For instance, if the connection mode, which may be used by the tenant, may be the LAN access mode, LAN connection points may be used in an actual network. The resource zone of the connection mode or connection points of the tenant may be determined from the more than one resource zone found in block 1203 according to the connection mode or connection points used by the tenant. If the number of the determined resource zone is one, the determined resource zone may be taken as the resource zone, which may best match the service template. If the number of the determined resource zones is larger than one, one resource zone, which may best match the service template, may be found from the determined resource zones according to service requested by the tenant.

The resource zone, which may best match the service template, may be selected according to a service requested by the tenant.

The service requested by the tenant may correspond to the service template. According to an example, in block 102B, the service templates may be generated according to the services requested by the tenant, to ensure that the service templates corresponding to all possible services may be generated.

The location of the access interface of an edge access layer of the data center may be determined according to the service requested by the tenant. For instance, if the service requested by the tenant is a Service Advertising Protocol (SAP) service, the data center may provide two SAP servers. The SAP server allocated to the tenant may be the SAP server1. The location of the access interface of the edge access layer of the data center may be determined to find a resource zone including the SAP Server1 from multiple resource zones. If the number of the resource zone, which may best match service template, is one, the network resource matching the service unit may be found from the resource zone. If the number of the resource zones, which may best match the service template, is larger than one, one resource zone may be selected from the resource zones and taken as the resource zone, which may best match the service template.

In block 1204, a network resource matching the service unit of the service template may be found from the matched resource zone.

Figure 13:
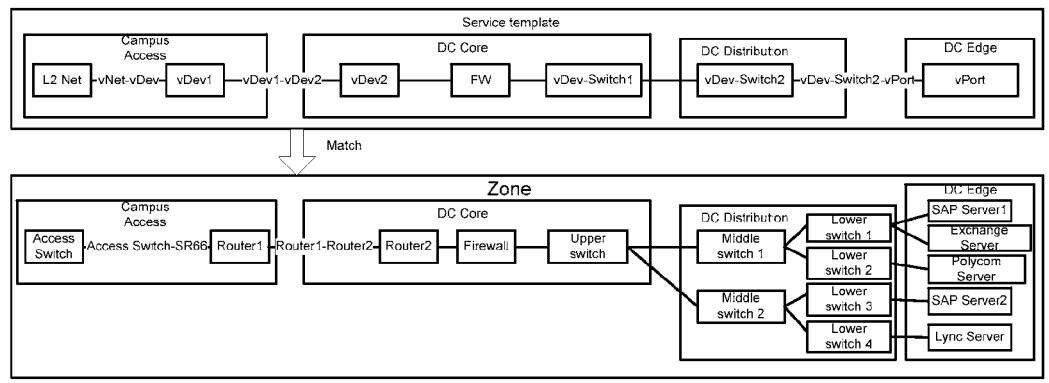
FIG. 13 is a schematic diagram illustrating a matching relationship between a service unit in a service template and a network resource in a resource zone of a resource pool in accordance with an example of the present disclosure.

According to an example, the method for searching for the network resource matching the service unit from the resource zone may include: identifying a network role of the service unit in the service template and searching for the network resource, the network location and function of which may be the same as the network role of the service unit in the service template, from the resource zone. FIG. 13 is a schematic diagram illustrating a matching relationship between a service unit in a service template and a network resource in a resource zone of a resource pool in accordance with an example of the present disclosure.

If no network resource matching the service unit is found from the resource zone, a network resource may be designated for the service unit.

In block 1205, after a matching operation between the service unit and the network resource is finished, a network parameter configured for the service unit may be sent to the network resource.

According to an example of the present disclosure, the method for sending the network parameter configured from the service unit to the network resource may include:

identifying a network of the network resource;

sending the network parameter configured for the service unit to the network resource if the network of the network resource is a physical network;

converting the network parameter configured for the service unit into a flow table rule if the network of the network resource is an SDN network, sending the flow table rule to a controller in the SDN network, so that the controller may save the flow table rule or send the flow table rule to the network resource; and sending the network parameter configured for the service unit to the network resource via calling an interface of the network resource or calling an interface provided by a management system for managing a virtual network if the network of the network resource is a virtual network.

It should be noted that according to an example, in order to ensure that the service requested by the tenant may be operated normally, before sending the network parameter configured for the service unit to the network resource, the administrator may adjust the network parameter of the service unit according to the service requested by the tenant. For instance, if the tenant applies for a host, a link from the tenant to the host may be an all-path. Since the all-path may connect with multiple ports, the bandwidth of the link may be minimum bandwidth of the ports. Since multiple links may share a same port, a determination as to whether the available bandwidth of the port is enough for the tenant may be made. If the available bandwidth is not enough, when the network parameter is sent to the network device corresponding to the port, the maximum available bandwidth of the port in the network parameter may be increased. Alternatively, the bandwidth permitted by the port may be increased to satisfy the service requested by tenant.

After sending the network parameter of each service unit in the service template matching the service requested by the tenant to the network resource matching the service unit in the resource zone, the operation for allocating the network resource to the service requested by the tenant may be finished. Therefore, the service requested by the tenant may be executed. For instance, a user in the CA may buy a service, such as an Email application, an operation of accessing the data center via the WAN in the CA may be completed with the flow shown in FIG. 12. Then, the tenant may access the CA via a connection point of the CA, connect with the data center network via the WAN, access the data center network via a VPN connection point of the data center, access an edge access device connected with an Email service host and access an Email service. The whole link may be considered as a network slice, i.e. a network slice of the tenant. The tenant may do not know existence of the whole data center. What the tenant may know is the sliced network. The separation of network access of different tenants may be implemented and network access speed may be enhanced.

It may be seen from the flow shown in FIG. 12 that in an example of the present disclosure, the service template may be matched with the resource zone in the actual network, the network resource matching the service unit in the service template may be found from the resource zone and the network parameter set for the service unit may be sent to the network resource matching the service unit. Therefore, intelligent management of the network configuration may be implemented and network configurations of the network resources in the actual network may be automatically deployed. With auto-deployment of the network resources, the burden of the network administrator may be reduced.

If different tenants apply for different services, the network resources in the resource pool may be allocated several times. Since there may be a lot of tenants and network resources, how to manage these network resources may be an urgent problem. A scheme for managing and monitoring the network resource pool provided by an example of the present disclosure may be described hereinafter.

After the matching operation between the service unit and the network resource performed in blocks 1201 to 1204, the network parameter configured for the service unit may be sent to the network resource, the network resource may be allocated to the tenant and usage state information may be updated. The method for updating the usage state information of the network resource may include: updating a usage state of the network resource, updating used amount and remaining amount of the network resource or updating the usage state, used amount and remaining amount of the network resource.

If the network resource matching the service unit is an exclusive resource, the usage state of the network resource may be configured as "used" and the used amount and remaining amount may not be recorded. If the network resource matching the service unit is a shared resource, the usage state of the network resource may be "unused". The usage state of the network resource may be updated as "used". If the usage state of the network resource is "used", the usage state may be maintained and the used amount and remaining amount of the network resource may be updated according to a value of the network parameter configured for the service unit. Lease time of the network resource may be recorded. Tenant information, amount of the network resource used by the tenant and a lease period of the network resource may be recorded for subsequent query.

If the service unit is the vPort, the resource of the vPort may include bandwidth. Attributes of the bandwidth may include: total bandwidth and available bandwidth. The method may include: limiting the CIR of the bandwidth. If the CIR of the bandwidth of the vPort is configured as 2M when the service template is created and the value of a bandwidth variable of a port in the network resource matching the vPort is 5M, the bandwidth of a network port resource used by the tenant may be 2M and remaining bandwidth of the network port resource may be 5M−2M=3M.

The usage state, used amount and remaining amount of each pooling resource indicator of the network resource may be respectively recorded.

As for each network resource, the usage state, used amount and remaining amount of each pooling resource indicator of the network resource may be respectively updated. For instance, as for a connection point resource, the usage state, used amount and remaining amount of the port, VLAN, IP address segment and bandwidth may be updated. If the network resource is the exclusive resource, such as an exclusive port, the usage state may be updated according to whether the network resource is used. The usage state may include: "unused" and "used". If the network resource is the shared resource, such as a shared port, the used amount and remaining amount of the network resource besides the usage state of the network resource may be updated.

If the lease time of a network resource in the resource pool expires, the network parameter sent to the network resource when the lease time starts may be deleted, the usage state of the network resource may be updated, the used amount and remaining amount of the network resource may be updated or the usage state, used amount and remaining amount of the network resource may be updated.

For instance, when the lease time of an exclusive resource expires, the usage state of the network resource may be modified as "unused". When the lease time of a shared resource in the resource pool expires, the used amount and remaining amount of the network resource may be updated according to the value of the network parameter configured for the service unit. If the used amount is zero, the usage state of the network resource may be updated as "unused".

For instance, if remaining bandwidth of a network port resource is 3M, the used bandwidth of the network port resource is 2M, the lease time of the network resource expires and the CIR configured for the service unit matching the network resource is 2M, the remaining bandwidth of the network port resource may be 3M+2M=5M and the used bandwidth may be zero. Since the network port resource is not used by any tenant, the usage state of the network port resource may be restored as "unused".

Furthermore, according to an example of the present disclosure, a health state of each network resource may be calculated in time according to the usage state, used amount, remaining amount and a health indicator of each network resource in the resource pool.

According to an example of the present disclosure, the health indicator may be configured for each pooling resource indicator in each network resource. The health state of each pooling resource indicator may be determined according to the usage state of each pooling resource indicator or may be determined according to the usage state, used amount, remaining amount and health indicator of each pooling resource indicator. The health state of the network resource may be determined according to the health indicator of the network resource and the health state of each pooling resource indicator. For instance, as for the bandwidth, a bandwidth upper limit and a bandwidth lower limit may be configured. When the remaining bandwidth is larger than the bandwidth lower limit and less than the bandwidth upper limit, the health state of the bandwidth may be healthy.

Figure 14:
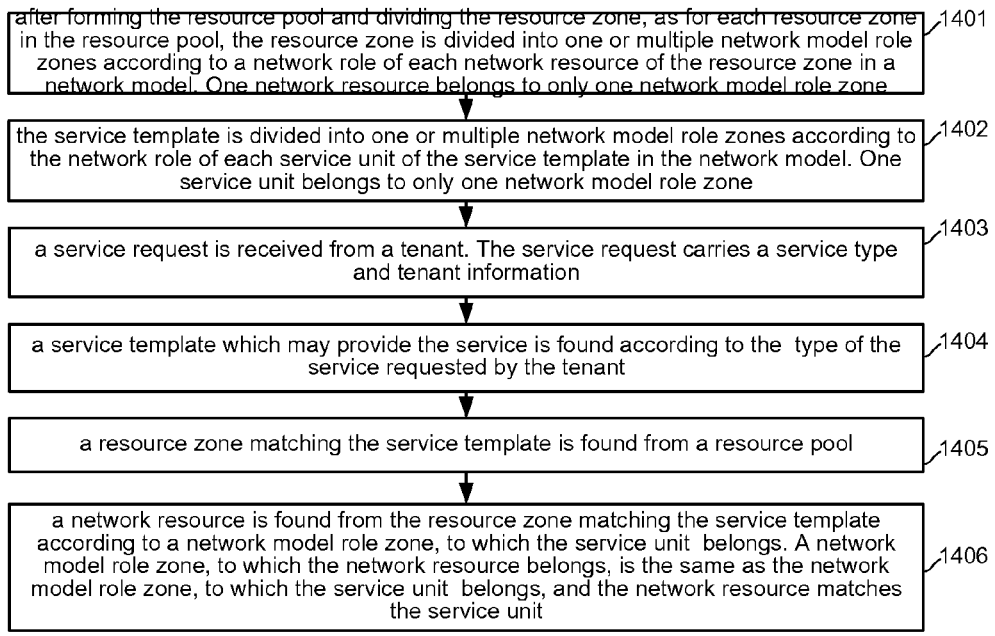
FIG. 14 is a flow chart illustrating a method for matching a service unit in a service template and a network resource in a resource zone in accordance with an example of the present disclosure.

FIG. 14 is a flow chart illustrating a method for matching a service unit in a service template and a network resource in a resource zone described in block 1204 in accordance with an example of the present disclosure. As shown in FIG. 14, the method may include following blocks.

In block 1401, as for each resource zone, the resource zone may be divided into one or multiple network model role zones according to a network role of each network resource of the resource zone in a network model.

One network resource may belong to one network model role zone. According to an example, one network resource may belong to only one network model role zone.

A determination as to how many network model role zones are divided may be made according to types of the network roles in the network model. The number of the types of the network roles in the network model may be the same as the number of the network model role zones obtained by dividing the resource zone. The network role may be divided according to a network location and function. When the network model is generated in block 101B, the number of the network roles in the network model may have been determined. The Campus Access+DC network model shown in the illustrative example of the FIG. 3 may include four kinds of network roles, i.e., Campus Access, DC Core, DC Distribution and DC Edge.

In block 1402, as for each service template, the service template may be divided into one or multiple network model role zones according to the network role of each service unit of the service template in the network model.

One service unit may belong to one network model role zone. According to an example, one service unit may belong to only one network model role zone.

In block 1403, a service request may be received from a tenant. The service request may carry a type of a service.

In block 1404, a service template which may provide the service may be found according to the type of the service requested by a tenant.

In block 1405, a resource zone matching the service template may be found from a resource pool.

In block 1406, as for each service unit in the service template, a network resource may be found from the resource zone matching the service template according to a network model role zone, to which the service unit may belong. A network model role zone, to which the network resource may belong, may be the same as the network model role zone, to which the service unit may belong, and the network resource may match the service unit.

How to divide the resource zone and service template according to the network model role and how to match the service template and resource zone may be described hereinafter.

Figure 15:
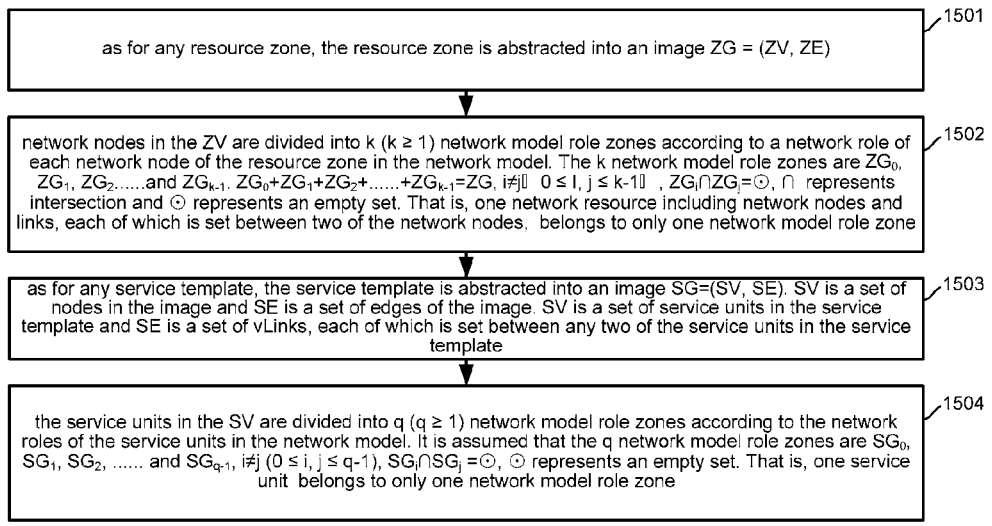
FIG. 15 is a flow chart illustrating a method for dividing a resource zone and a service template based on a network role in accordance with an example of the present disclosure.

FIG. 15 is a flow chart illustrating a method for dividing a resource zone and a service template based on a network role in accordance with an example of the present disclosure. As shown in FIG. 15, the method may include following blocks.

In block 1501, as for any resource zone, the resource zone may be abstracted into an image ZG=(ZV, ZE).

ZV may be a set of nodes in the image and ZE may be a set of edges of the image. ZV may be a set of network nodes in the resource zone. ZE may be a set of links, each of which may be set between two network nodes.

Each edge may be expressed as a dot pair (uz, wz), uz and wz∈ZV. ∈ may represent "belong", uz and wz may be any two network nodes having a linking relationship in the resource zone.

In block 1502, network nodes in the ZV may be divided into k (k≥1) network model role zones according to a network role of each network node of the resource zone in the network model. The k network model role zones may be $ZG_0, ZG_1, ZG_2 \ldots$ and $ZG_{k-1}$. $ZG_0+ZG_1+ZG_2+\ldots+ZG_{k-1}=ZG$, i≠j (0≤l, j≤k−1), $ZG_i \cap ZG_j = \odot$, ∩ may represent intersection and ⊙ may represent an empty set. That is, one network resource including network nodes and links, each of which may be set between two of the network nodes, may belong to only one network model role zone.

As for any node uz∈ZG, P[uz] may represent a network model role zone, to which the uz may belong, 1≤P[uz]≤k. That is, uz may belong to a network model role zone $ZG_m$, (0≤m≤k−1), P[uz]=m+1.

Figure 16:
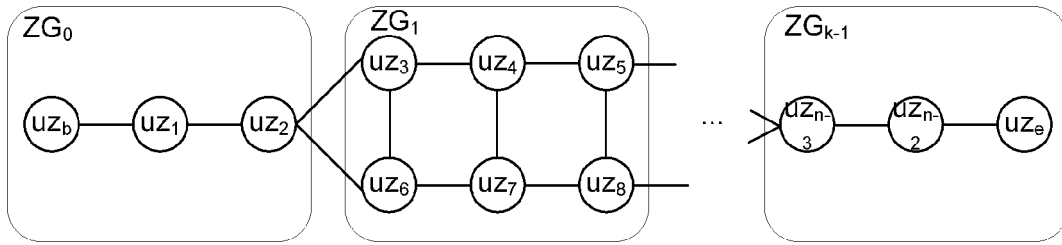
FIG. 16 is a schematic diagram illustrating a method for dividing a resource zone based on a network role in accordance with an example of the present disclosure.

As shown in FIG. 16, network nodes $uz_b$, $uz_1$-$uz_{n-2}$ and $uz_e$ in the resource zone and links, each of which may be set between two of the network nodes $uz_b$, $uz_1$-$uz_{n-2}$ and $uz_e$, may be divided into k−1 network model role zones $ZG_0$, $ZG_1$, . . . , $ZG_{k-1}$, according to the network roles.

For instance, as for a resource zone in the resource pool, the resource zone may be divided into four network model role zones according to the network roles of the network nodes of the resource zone in the network model. The four network model role zones may include: Campus Access, DC Core, DC Distribution and DC Edge. The network resources in each of the network model role zones may be different.

In block 1503, as for any service template, the service template may be abstracted into an image SG=(SV, SE). SV may be a set of nodes in the image and SE may be a set of edges of the image. SV may be a set of service units in the service template and SE may be a set of vLinks, each of which may be set between any two of the service units in the service template.

Each edge may be expressed as a dot pair (us, ws), us and ws∈SV. That is, us and ws may be any two of the service units having a virtual linking relationship in service template.

Weight of a node may be expressed as an attribute, resource or method configured for a service unit. Weight of an edge may be expressed as an attribute, resource or method of a service unit of a vLink type.

In block 1504, the service units in the SV may be divided into q (q≥1) network model role zones according to the network roles of the service units in the network model. It may be assumed that the q network model role zones may be $SG_0$, $SG_1$, $SG_2$, . . . and $SG_{q-1}$, i≠j (0≤i, j≤q−1), $SG_i \cap SG_j = \odot$, ⊙ may represent an empty set. That is, one service unit may belong to only one network model role zone.

Any service unit us∈SG, P[us] may represent a network model role zone, to which us may belong, 1≤P[us]≤q. If us belongs to a network model role zone $SG_p$ (0≤p≤q−1), P[us]=p+1.

Furthermore, if a node is an edge node of the network model role zone, cross-zone edge number of the node may be recorded. For instance, if two edges of an edge node x in a network model role zone, i.e. Campus, may be respectively set across two network model role zones, i.e. Campus Access and DC Core, the cross-zone edge number of the node x may be two.

Figure 17:
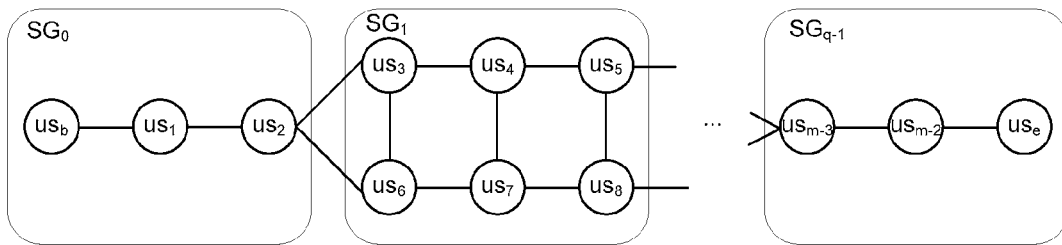
FIG. 17 is a schematic diagram illustrating a method for dividing a service template based on a network role in accordance with an example of the present disclosure.

As shown in FIG. 17, the service units $us_b$, $us_1$-$us_{m-2}$ and $us_e$ and links, each of which may be set between two of the service units $us_b$, $us_1$-$us_{m-2}$ and $us_e$ may be divided into q−1 network model role zones $SG_0$, $SG_1$, . . . and $SG_{q-1}$ according to the network roles.

For instance, a service template may be formed by multiple service units. The service unit may be divided into four network model role zones, i.e. Campus Access, DC Core, DC Distribution and DC Edge. Service units in each of the network model role zone may be different.

After the resource zone and service template are divided according to the network model roles, the operation for matching the service template and resource zone may be performed.

Figure 18:
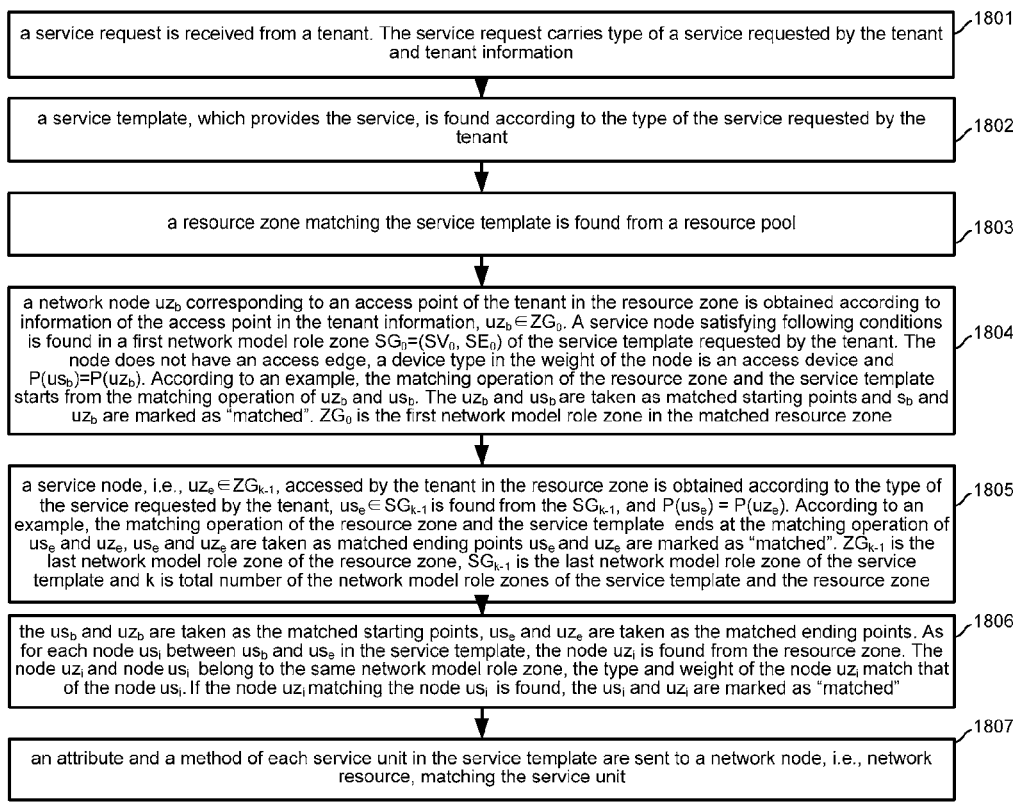
FIG. 18 is flow chart illustrating another method for matching a service template and a resource zone in accordance with an example of the present disclosure.

FIG. 18 is a flow chart illustrating another method for matching a service template and a resource zone in accordance with an example of the present disclosure. As shown in FIG. 18, the method may include following blocks.

In block 1801, a service request may be received from a tenant. The service request may carry type of a service requested by the tenant and tenant information.

In block 1802, a service template, which may provide the service, may be found according to the type of the service requested by the tenant.

In block 1803, a resource zone matching the service template may be found from a resource pool.

In block 1804, a network node $uz_b$ corresponding to an access point of the tenant in the resource zone may be obtained according to information of the access point in the tenant information, $uz_b \in ZG_0$. A service node satisfying following conditions may be found in a first network model role zone $SG_0=(SV_0, SE_0)$ of the service template requested by the tenant. The node may not have an access edge, a device type in the weight of the node may be an access device and $P(us_b)=P(uz_b)$. According to an example, the matching operation of the resource zone and the service template may start from the matching operation of $uz_b$ and $us_b$. The $uz_b$ and $us_b$ may be taken as matched starting points and $s_b$ and $uz_b$ may be marked as "matched". $ZG_0$ is the first network model role zone in the matched resource zone.

The function $P(us_b)=P(uz_b)$ may denote that nodes $us_b$ and $uz_b$ may be located at the same network model role zone.

The tenant information may include access point information of the tenant. The network node $uz_b$ corresponding to the access point may be found from the resource zone according to the access point information.

Figure 19:
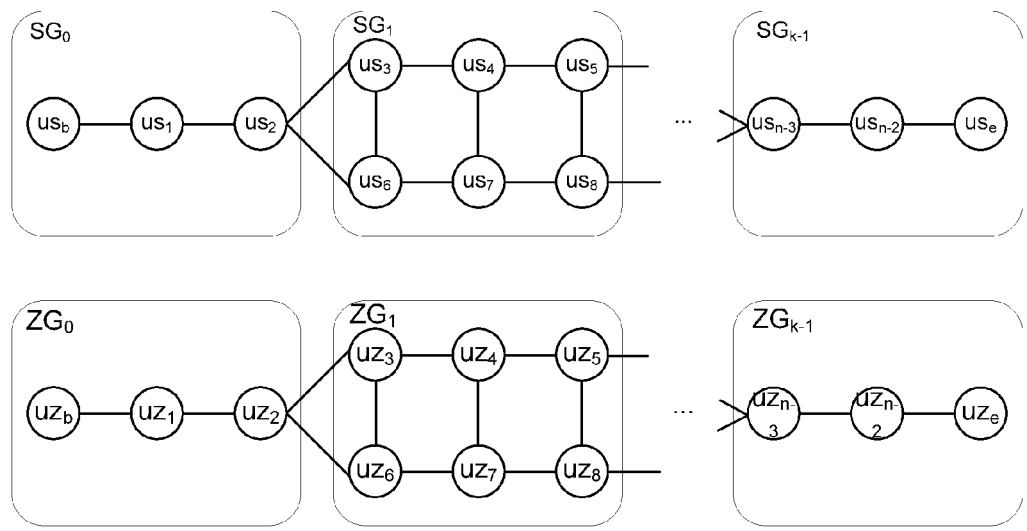
FIG. 19 is a schematic diagram illustrating a method for matching a service template and a resource zone in accordance with an example of the present disclosure.

FIG. 19 is a schematic diagram illustrating how to match a service template and a resource zone in accordance with an example of the present disclosure. As shown in FIG. 19, when a matching operation is performed for the service template and the network model of the resource zone, a matched starting point, i.e., $uz_b \in ZG_0$ may be found from the first network model role zone, i.e., $ZG_0$ according to the access point information of the tenant. The node $us_b$, in which the node $us_b$ may not have an access edge, the device type in the weight may be the access device and $P(us_b)=P(uz_b)$, may be found from the first network model role zone, i.e., $SG_0=(SV_0, SE_0)$ of the service template. Therefore, $us_b$ and $uz_b$ may match each other.

In block 1805, a service node, i.e., $uz_e \in ZG_{k-1}$, accessed by the tenant in the resource zone may be obtained according to the type of the service requested by the tenant, $us_e \in SG_{k-1}$ may be found from the $SG_{k-1}$, and $P(us_e)=P(uz_e)$. According to an example, the matching operation of the resource zone and the service template may end at the matching operation of $us_e$ and $uz_e$, $us_e$ and $uz_e$ may be taken as matched ending points $us_e$ and $uz_e$ may be marked as "matched". $ZG_{k-1}$ may be the last network model role zone of the resource zone, $SG_{k-1}$ may be the last network model role zone of the service template and k may be total number of the network model role zones of the service template and the resource zone.

According to the type of the service requested by the tenant, a node, which may provide the service, may be found from the resource zone. The node may be the service node $uz_e$ to be accessed by the tenant and may be the last node, i.e., the ending point of the resource zone matching the service template.

Referring to FIG. 19, according to the type of the service requested by the tenant, the service node, i.e., $uz_e \in ZG_{k-1}$ may be found from the resource zone, $uz_e$ may be a matched ending point in the resource zone. Furthermore, the $us_e$ matching the $uz_e$ may be found from the last network model role zone, i.e., $SG_{k-1}$ of the service template.

In block 1806, the $us_b$ and $uz_b$ may be taken as the matched starting points, $us_e$ and $uz_e$ may be taken as the matched ending points. As for each node $us_i$ between $us_b$ and $us_e$ in the service template, the node $uz_i$ may be found from the resource zone. The node $uz_i$ and node $us_i$ may belong to the same network model role zone, the type and weight of the node $uz_i$ may match that of the node $us_i$. If the node $uz_i$ matching the node $us_i$ may be found, the $us_i$ and $uz_i$ may be marked as "matched".

Referring to FIG. 19, starting from the starting point $us_b$ of the service template, nodes in the resource zone respectively matching the nodes $us_b$, $us_1$, $us_2$, $us_3$, ..., $us_{n-3}$, $us_{n-2}$ and $us_e$ may be searched in turn, until the node matching the node $us_e$ may be found.

If a network resource matching the service unit is not found in the resource zone, a network resource in the resource zone may be designated as the network resource matching the service unit.

Weight matching of the node may refer to that the attribute, resource and method of the service unit in the service template may respectively match the attribute, resource and method of the network resource in the resource zone.

For instance, the service unit may be a vDev and the vDev may further include other service units, such as a vRouter and a vSwitch. Each service unit may have its attribute, resource and method. The network device in the resource zone may include: a Router and Switch, etc. When a matching operation is performed for a service unit in the service template and a network device in the resource zone, the matching operation may be performed to determine whether the type of the service unit may be matched with that of the network device. If the type of the service unit is matched with that of the network device, the matching operation may be performed to determine whether the attribute, resource and method of the service unit may be respectively matched with the attribute, resource and method of the network device in the resource zone. If the attribute, resource and method of the service unit may be respectively matched with the attribute, resource and method of the network device in the resource zone, the service unit may match the network device.

For instance, basic attributes of a service unit, i.e. vPort may include: a device_id, name, state, speed and acl. The resource may include: bandwidth. The attributes of the bandwidth may include: total bandwidth and available bandwidth. The method may include: limiting the CIR of the bandwidth. If the CIR of the bandwidth of the vPort is set as "2M" when the administrator creates the service template and a value of available bandwidth of a port of a network device, which is found from the resource zone and belongs to a same network model as that of the vPort, is "5M", since 5M is larger than 2M, the vPort may match the network port resource in the resource zone.

In block 1807, an attribute and a method of each service unit in the service template may be sent to a network node, i.e., network resource, matching the service unit.

Figure 20:
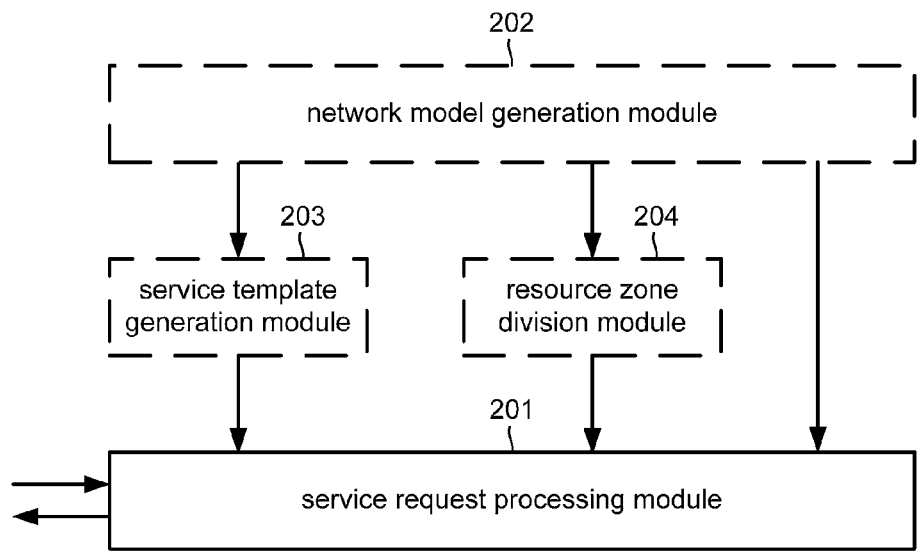
FIG. 20 is a schematic diagram illustrating structure of a network configuration auto-deployment device in accordance with an example of the present disclosure.

FIG. 20 is a schematic diagram illustrating a network configuration auto-deployment device in accordance with an example of the present disclosure. Referring to FIG. 20, the device may include a service request processing module 201.

The service request processing module 201 may be to search for a service template providing a service according to type of the service applied by a tenant, search for a resource zone matching the service template from a resource pool, search for a network resource matching a service unit in the service template from the resource zone and send a network parameter configured for the service unit to the network resource.

The network configuration auto-deployment device may further include: a network model generation module 202, a service template generation module 203 and a resource zone division module 204.

The network model generation module 202 may be to generate a network model with a network role.

The service template generation module 203 may be to apply the service unit to the network role in the network model to generate the service template applied to the network model.

The resource zone division module 204 may be to perform a pooling operation for the network resource in an actual network to generate the resource pool, divide the network resource in the resource pool into the resource zone and allocate a corresponding network model to the resource zone.

According to an example, the network model may be applied to one or any combination of a physical network, a virtual network and an SDN network. The actual network may be one of or any combination of the physical network, the virtual network and the SDN network. With development of technologies, this device may be applied to other new networks.

According to an example, the resource zone division module 204 may further to determine a discovery scope of the network resource, search for all nodes and links via topology in the discovery scope and form the network resource in the resource pool with the nodes and links.

The service request processing module 201 may be further to send the network parameter configured for the service unit to the network resource when the actual network is a physical network;

convert the network parameter configured for the service unit into a flow table rule and send the flow table to a controller, which stores the flow table rule or sends the flow table rule to the network resource, in a Software Defined Networking (SDN) network when the actual network is the SDN network; and send the network parameter configured for the service unit to the network resource via calling an interface of the network resource or an interface provided by a management system managing a virtual network when the actual network is the virtual network.

The resource zone division module 204 may be further to determine a network model at least comprising a network role, location and function of which matches that of the network resource, in the resource zone and allocate the determined network model to the resource zone.

The service request processing module 201 may be further to identify the network model, to which the service template applies, search for the resource zone corresponding to the network model, to which the service template applies, from the resource pool and take the resource zone as that matching the service template.

The resource zone division module 204 may be further to search for a network role, location and function of which matches that of the network resource, from the network model corresponding to the resource zone according to the location and function of the network resource in the resource zone and allocate the network role to the network resource.

The service request processing module 201 may be further to identify the network role of the service unit in the service template, search for network resources with the network role from the resource zone and search for the network resource, location and function of which matches with that of the service unit from the network resources.

According to an example, the service request processing module 201, network model generation module 202, service template generation module 203 and resource zone division module 204 may be software modules, e.g., sets of machine readable instructions, stored in a hardware memory device. In another example, the service request processing module 201, network model generation module 202, service template generation module 203 and resource zone division module 204 may be hardware modules on a hardware device. In a further example, the service request processing module 201, network model generation module 202, service template generation module 203 and resource zone division module 204 may include a combination of software and hardware modules.

Figure 21:
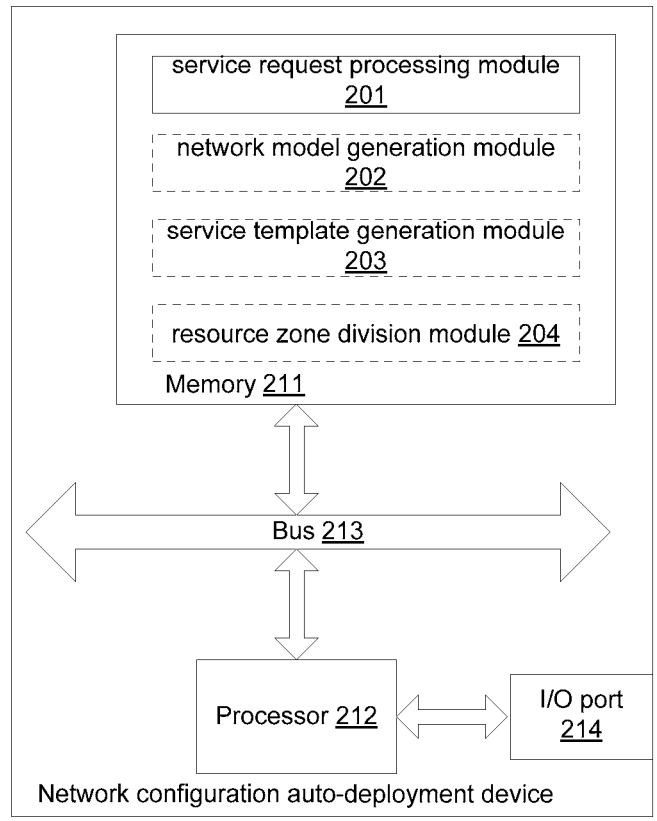
FIG. 21 is a schematic diagram illustrating another structure of a network configuration auto-deployment device in accordance with an example of the present disclosure.

FIG. 21 is a schematic diagram illustrating another structure of a network configuration auto-deployment device in accordance with an example of the present disclosure.

Referring to FIG. 21, the network configuration auto-deployment device may include: a memory 211, a processor 212, a bus 213 and an I/O port 214.

The memory 211 may connect with the processor 212 and the bus 213. The processor 212 may communicate with an external device via the I/O port 214.

The memory 211 may store the service request processing module 201.

The processor 212 may communicate with the memory 211, execute an operation performed by the service request processing module 201.

The memory 211 may further store the network model generation module 202, service template generation module 203 and resource zone division module 204. The processor 212 may further respectively execute operations performed by the above network model generation module 202, service template generation module 203 and resource zone division module 204.

The above service request processing module 201, network model generation module 202, service template generation module 203 and resource zone division module 204 may be machine readable instructions. The memory 211 may be a non-transitory computer readable storage medium.

Figure 22:
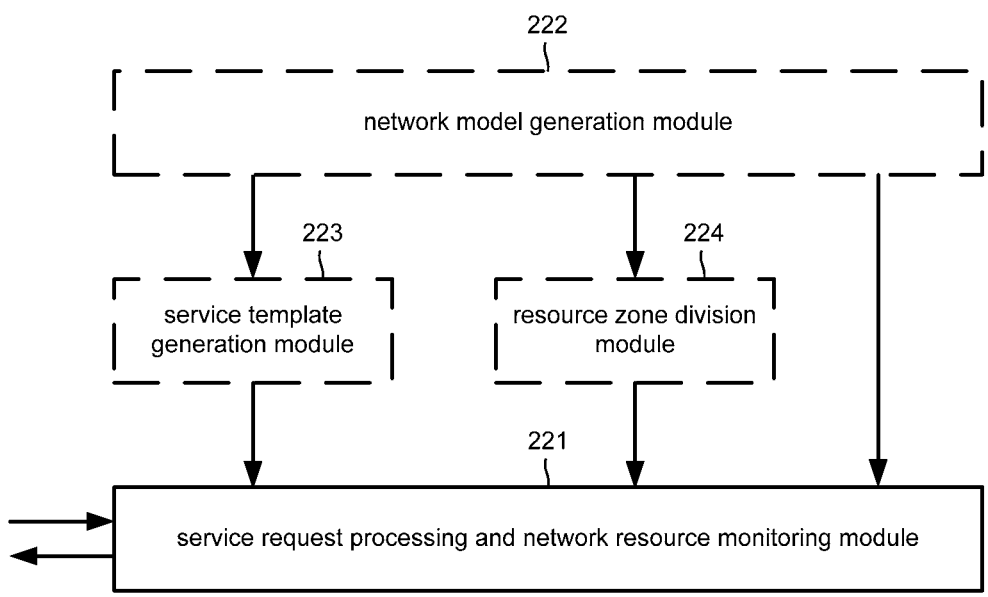
FIG. 22 is a schematic diagram illustrating structure of a network resource monitoring device in accordance with an example of the present disclosure.

FIG. 22 is a schematic diagram illustrating a network resource monitoring device in accordance with an example of the present disclosure. Referring to FIG. 22, the device may include: a service request processing and network resource monitoring module 221.

The service request processing and network resource monitoring module 221 may be configured to search for a service template providing a service according to type of the service, search for a resource zone matching the service template from a resource pool, search for a network resource matching a service unit in the service template from the resource zone, send a network parameter configured for the service unit to the network resource and update usage state information of the network resource.

The network resource monitoring device may further include: a network model generation module 222, a service template generation module 223 and a resource zone division module 224.

The network model generation module 222 may be configured to generate a network model with a network role.

The service template generation module may be configured to apply the service unit to the network role in the network model to generate the service template applied to the network model.

The resource zone division module 224 may be configured to perform a pooling operation for the network resource in an actual network to generate the resource pool, divide the network resource in the resource pool into the resource zone and allocate a corresponding network model to the resource zone.

According to an example, the usage state information of the network resource may include: a usage state of the network resource. Alternatively, the usage state information of the network resource may include: used amount and remaining amount of the network resource. Alternatively, the usage state information of the network resource may include: the usage state, used amount and remaining amount of the network resource.

The service request processing and network resource monitoring module 221 may be configured to update a usage state of the network resource, update used amount and remaining amount of the network resource, or update the usage state, used amount and remaining amount of the network resource.

According to an example, the network model may be applied to one or any combination of a physical network, a virtual network and an SDN network. The actual network may be one of or any combination of the physical network, the virtual network and the SDN network. With development of technologies, this device may be applied to other new networks.

Each network resource in the resource pool formed by the resource zone division module 224 may have one or multiple pooling resource indicators. The service request processing and network resource monitoring module 221 may further update the usage state of the network resource by updating the usage state of the pooling resource indicator of the network resource. Alternatively, the service request processing and network resource monitoring module 221 may update the used amount and remaining amount of the network resource by updating used amount and remaining amount of the pooling resource indicator of the network resource. Alternatively, the service request processing and network resource monitoring module 221 may update the usage state, used amount and remaining amount of the network resource by updating the usage state, used amount and remaining amount of the pooling resource indicator of the network resource.

The service request processing and network resource monitoring module may be further configured to record tenant information of the network resource, amount of the network resource used by a tenant and a lease period.

The service request processing and network resource monitoring module 221 may further be configured to delete the network parameter sent to the network resource when lease time of the network resource in the resource pool expires, update the usage state of the network resource, or update the used amount and remaining amount of the network resource or update the usage state, used amount and remaining amount of the network resource.

The service request processing and network resource monitoring module 221 may be further configured to calculate and update a health state of the network resource according to the usage state information and a health indicator of the network resource in the resource pool.

The resource zone division module 224 may be further configured to determine a network model at least comprising a network role, location and function of which matches that of the network resource in the resource zone and allocate the network model to the resource zone.

According to an example, the service request processing and network resource monitoring module 221, the network model generation module 222, the service template generation module 223 and the resource zone division module 224 may be software modules, e.g., sets of machine readable instructions, stored in a hardware memory device. In another example, the service request processing and network resource monitoring module 221, the network model generation module 222, the service template generation module 223 and the resource zone division module 224 may be hardware modules on a hardware device. In a further example, the service request processing and network resource monitoring module 221, the network model generation module 222, the service template generation module 223 and the resource zone division module 224 may include a combination of software and hardware modules.

Figure 23:
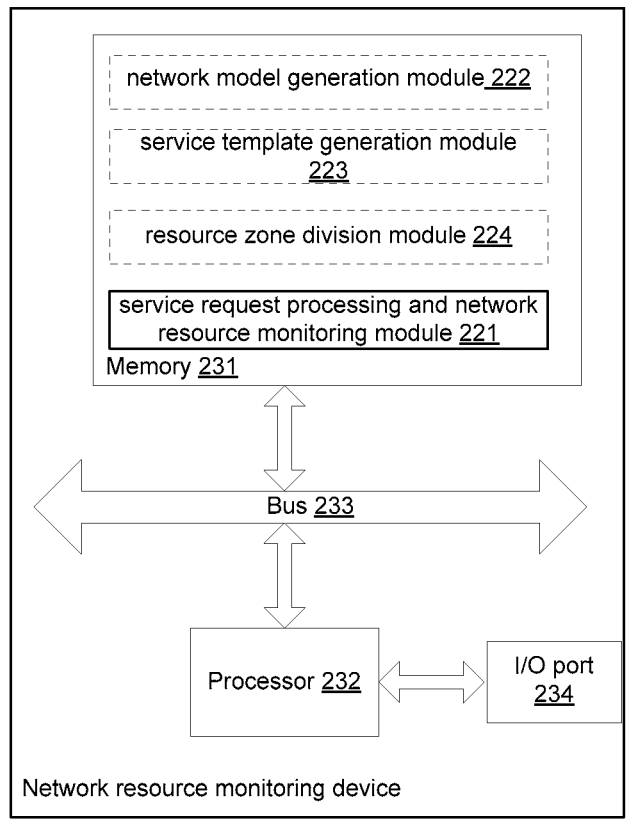
FIG. 23 is a schematic diagram illustrating another structure of a network resource monitoring device in accordance with an example of the present disclosure.

FIG. 23 is a schematic diagram illustrating another structure of the network resource monitoring device in accordance with an example of the present disclosure.

Referring to FIG. 23, the network resource monitoring device may include: a memory 231, a processor 232, a bus 233 and an I/O port 234.

The memory 231 may connect with the processor 232 and the bus 233. The processor 232 may communicate with an external device via the I/O port 234.

The memory 231 may store a service request processing and network resource monitoring module 221.

The processor 232 may communicate with the memory 231, execute an operation performed by the service request processing and network resource monitoring module 221.

The memory 231 may further store the network model generation module 222, the service template generation module 223 and the resource zone division module 224. The processor 232 may further execute operations respectively performed by the network model generation module 222, the service template generation module 223 and the resource zone division module 224.

According to an example, the above service request processing and network resource monitoring module 221, the network model generation module 222, the service template generation module 223 and the resource zone division module 224 may be machine readable instructions. The memory 231 may be a non-transitory computer readable storage medium.

Figure 24:
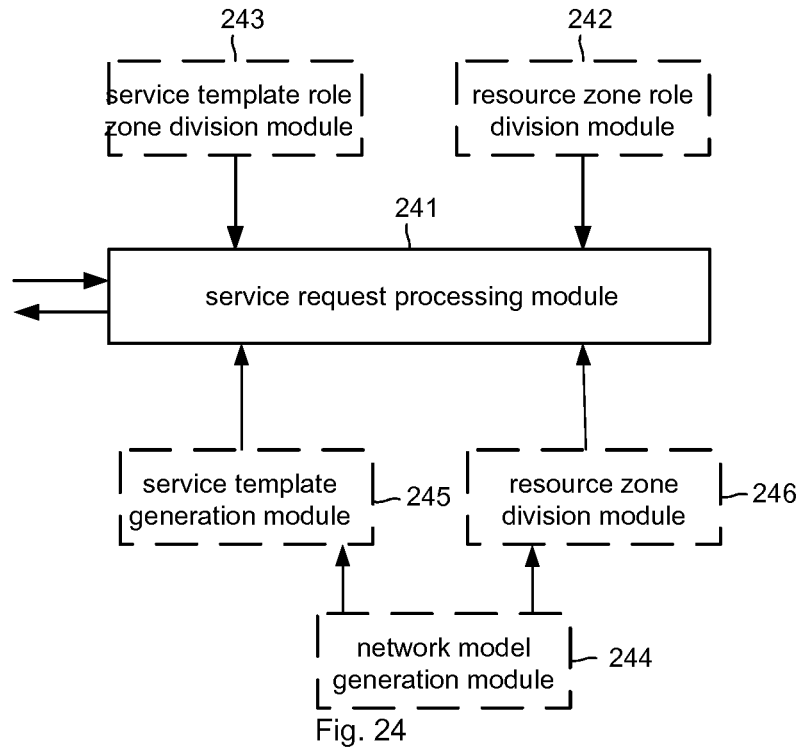
FIG. 24 is a schematic diagram illustrating structure of a network resource matching device in accordance with an example of the present disclosure.

FIG. 24 is a schematic diagram illustrating structure of a network resource matching device in accordance with an example of the present disclosure. Referring to FIG. 24, the device may include: a service request processing module 241.

The service request processing module 241 may be configured to receive a service request from a tenant, search for a service template providing a service according to type of the service in the service request, search for a resource zone matching the service template from a resource pool, obtain a network model role zone of the service template, obtain a network model role zone of the resource zone, search for a network resource from the resource zone matching the service template according to the network model role zone of a service unit in the service template. The network resource and the service unit belong to the same network model role zone and the network resource matches the service unit.

The network resource matching device may further include: a resource zone role division module 242 and a service template role zone division module 243.

The resource zone role zone division module 242 may be configured to divide the resource zone into one or multiple network model role zones according to network roles of network resources of the resource zone in a network model. One network resource may belong to one network model role zone.

According to an example of the present disclosure, one network resource may belong to only one network model role zone.

The service template role zone division module 243 may be configured to divide the service template into one or multiple network model role zones according to network roles of service units of the service template in the network model. One service unit may belong to one network model role zone.

According to an example, one service unit may belong to only one network model role zone.

According to an example, the service request may further include: tenant information.

The service request processing module 241 may be further configured to:

obtain a first network resource corresponding to an access point of the tenant from the resource zone matching the service template according to access point information in the tenant information, search for a first service unit matching the first network resource from a first network model role zone of the service template, take the first network resource and the first service unit as matched starting points; and/or search for a second network resource accessed by the tenant from the resource zone matching the service template according to the type of the service in the service request, search for a second service unit matching the second network resource from the last network model role zone of the service template and take the second network resource and the second service unit as matched ending points;

search for the network resource matching the service unit between the matched starting points and matched ending points of the service template from the resource zone matching the service template.

According to an example, the service request processing module 241 may be further configured to search for the first service unit, in which the first service unit may do not have a access link and a device type of the first service unit may be an access device, from the first network model role zone of the service template.

According to an example, the device shown in FIG. 24 may further include: a network model generation module 244, a service template generation module 245 and a resource zone division module 246.

The network model generation module 244 may be configured to generate the network model with network roles.

The service template generation module 245 may be configured to apply one or multiple service units into the network roles in the network model to generate the service template applied to the network model.

The resource zone division module 246 may be configured to find network resources in an actual network, perform a pooling operation for the network resources, form the resource pool with the network resources according to actual networking requirements, divide the network resources in the resource pool into one or multiple resource zones and allocate a network model for each resource zone according to the network model generated by the network model generation module 244.

According to an example, the service request processing module 241, resource zone role division module 242, service template role zone division module 243, network model generation module 244, service template generation module 245 and resource zone division module 246 may be software modules, e.g., sets of machine readable instructions, stored in a hardware memory device. In another example, the service request processing module 241, resource zone role division module 242, service template role zone division module 243, network model generation module 244, service template generation module 245 and resource zone division module 246 may be hardware modules on a hardware device. In a further example, the service request processing module 241, resource zone role division module 242, service template role zone division module 243, network model generation module 244, service template generation module 245 and resource zone division module 246 may include a combination of software and hardware modules.

Figure 25:
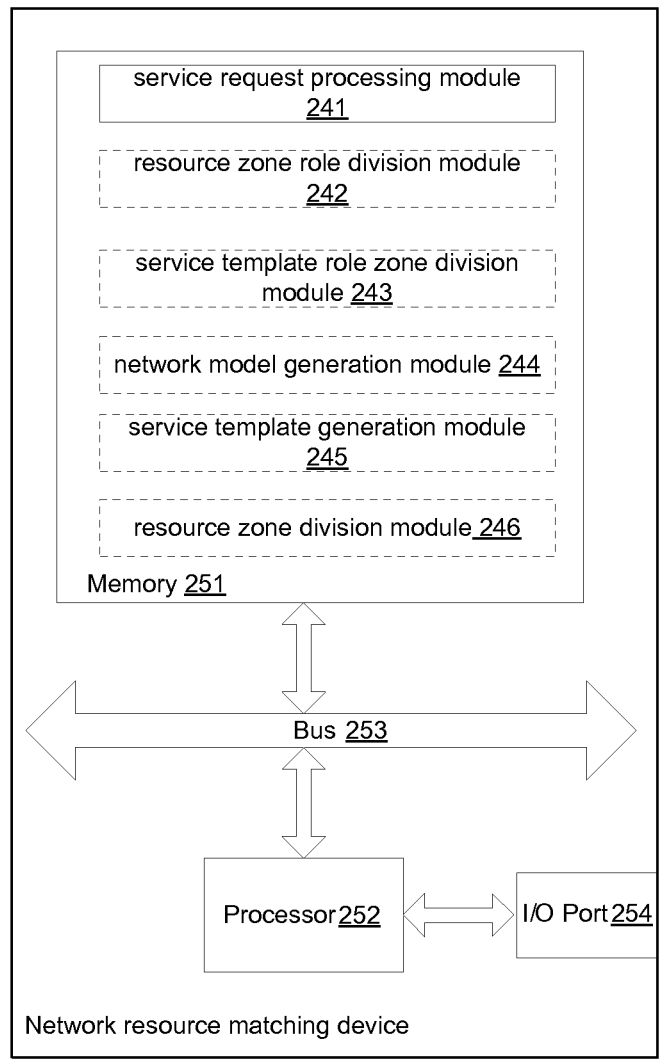
FIG. 25 is a schematic diagram illustrating another structure of a network resource matching device in accordance with an example of the preset disclosure.

FIG. 25 is a schematic diagram illustrating another structure of the network resource matching device in accordance with an example of the present disclosure.

Referring to FIG. 25, the network resource matching device may include: a memory 251, a processor 252, a bus 253 and an I/O port 254.

The memory 251 may connect with the processor 252 and the bus 253. The processor 252 may communicate with an external device via the I/O port 254.

The memory 251 may store the service request processing module 241.

The processor 252 may communicate with the memory 251, execute an operation performed by the service request processing module 241.

The memory 251 may further store the resource zone role division module 242, service template role zone division module 243, network model generation module 244, service template generation module 245 and resource zone division module 246. The processor 252 may further execute operations respectively performed by the resource zone role division module 242, service template role zone division module 243, network model generation module 244, service template generation module 245 and resource zone division module 246.

According to an example, the service request processing module 241, resource zone role division module 242, service template role zone division module 243, network model generation module 244, service template generation module 245 and resource zone division module 246 may be machine readable instructions. The memory 251 may be a non-transitory computer readable storage medium.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A network configuration auto-deployment method, comprising:
   locating, by a processing device, a service template providing a service according to a type of the service;
   locating a resource zone matching the service template from a resource pool;
   locating a network resource matching a service unit in the service template from the resource zone; and
   sending a network parameter for the service unit to the network resource, including:
   in response to a determination that a network of the network resource is a physical network, sending the network parameter for the service unit to the network resource,
   in response to a determination that the network is a Software Defined Networking (SDN) network, converting the network parameter for the service unit into a flow table rule, and sending the flow table rule to a controller, wherein the controller is to send the flow table rule to the network resource, and
   in response to a determination that the network is a virtual network, sending the network parameter for the service unit to the network resource via calling an interface of the network resource or an interface provided by a management system managing the virtual network.

2. The method according to claim 1, further comprising:
   generating a network model with a network role;
   applying the service unit to the network role in the network model to generate the service template applied to the network model;
   performing a pooling operation for the network resource in the network to generate the resource pool, dividing the network resource in the resource pool into the resource zone and allocating the network model to the resource zone.

3. The method according to claim 2, wherein locating the resource zone matching the service template from the resource pool comprises:
   identifying the network model, to which the service template applies;
   locating the resource zone corresponding to the network model, to which the service template applies, from the resource pool; and
   taking the resource zone as that matching the service template.

4. The method according to claim 3, further comprising:
   locating a network, role location and function of which matches that of the network resource from the network model corresponding to the resource zone according to the location and function of the network resource in the resource zone;
   wherein locating the network resource matching the service unit in the service template from the resource zone comprises: identifying the network role of the service unit in the service template, locating network resources with the network role from the resource zone and locating the network resource, location and function of which matches with that of the service unit from the network resources.

5. The method according to claim 2, further comprising:
determining a discovery scope of the network resource;
searching for all nodes and links via topology in the discovery scope; and
forming the network resource in the resource with the nodes and links.

6. The method according to claim 2, wherein allocating the network model to the resource zone comprises:
determining a network model comprising a network role, location and function of which matches that of the network resource in the resource zone; and
allocating the network model to the resource zone.

7. The method according to claim 2, wherein the service unit is a virtual object and the virtual object comprises: a vNet, a vDev, a vController, a vLink, a vPort, a vIP service, a vSecurity resource, a vHost or a vApp resource.

8. A network configuration auto-deployment device, comprising: a processor and a non-transitory storage medium storing machine readable instructions that when executed by the processor cause the processor to:
locate a service template providing a service according to a type of the service;
locate a resource zone matching the service template from a resource pool;
locate a network resource matching a service unit in the service template from the resource zone;
send a network parameter for the service unit to the network resource;
determine a network model comprising a network role, a location and a function that matches a function of the network resource in the resource zone; and
allocate the network model to the resource zone.

9. The device according to claim 8, wherein, to allocate the network model to the resource zone, the instructions are to cause the processor to:
apply the service unit to the network role in the network model to generate the service template applied to the network model; and
perform a pooling operation for the network resource in a network to generate the resource pool, divide the network resource in the resource pool into the resource zone and allocate the network model to the resource zone.

10. The device according to claim 9, wherein the instructions are to cause the processor to:
identify the network model, to which the service template applies,
locate the resource zone corresponding to the network model, to which the service template applies, from the resource pool, and
take the resource zone as that matching the service template.

11. The device according to claim 10, wherein the instructions are to cause the processor to:
locate a network role, location and function of which matches that of the network resource, from the network model corresponding to the resource zone according to the location and function of the network resource in the resource zone; and
identify the network role of the service unit in the service template, locate network resources with the network role from the resource zone and locate the network resource, location and function of which matches with that of the service unit from the network resources.

12. The device according to claim 9, wherein the instructions are to cause the processor to:
determine a discovery scope of the network resource, locate all nodes and links via topology in the discovery scope and form the network resource in the resource pool with the nodes and links.

13. The device according to claim 9, wherein the instructions are to cause the processor to:
send the network parameter for the service unit to the network resource when the network is a physical network,
convert the network parameter for the service unit into a flow table rule and send the flow table to a controller, which stores the flow table rule or sends the flow table rule to the network resource, in a Software Defined Networking (SDN) network when the network is the SDN network, and
send the network parameter for the service unit to the network resource via calling an interface of the network resource or an interface provided by a management system managing a virtual network when the network is the virtual network.

14. A non-transitory computer readable storage medium storing instructions that when executed by a processor cause the processor to:
locate a service template providing a service according to a type of the service;
locate a resource zone matching the service template from a resource pool;
locate a network resource matching a service unit in the service template from the resource zone; and
send a network parameter for the service unit to the network resource,
wherein to locate the network resource matching the service unit in the service template from the resource zone, the instructions are to cause the processor to:
identify a network role of the service unit in the service template, and
from the resource zone, locate the network resource, a location and a function that matches a function of the network role of the service unit in the service template.

15. The non-transitory computer readable storage medium according to claim 14, wherein the instructions are to cause the processor to:
generate a network model with a network role;
apply the service unit to the network role in the network model to generate the service template applied to the network model; and
perform a pooling operation for the network resource in a network to generate the resource pool, divide the network resource in the resource pool into the resource zone, and allocate the network model to the resource zone.

16. The non-transitory computer readable storage medium according to claim 15, wherein the instructions are to cause the processor to:
determine a discovery scope of the network resource, locate all nodes and links via topology in the discovery scope and form the network resource in the resource pool with the nodes and links.

17. The non-transitory computer readable storage medium according to claim 15, wherein the instructions are to cause the processor to:
send the network parameter for the service unit to the network resource when the network is a physical network, convert the network parameter for the service unit into a flow table rule and send the flow table to a controller, which stores the flow table rule or sends the flow table rule to the network resource, in a Software Defined Networking (SDN) network when the network is the SDN network, and send the network parameter for the service unit to the network resource via calling an interface of the network resource or an interface provided by a management system managing a virtual network when the network is the virtual network.

18. The non-transitory computer readable storage medium according to claim 15, wherein, to allocate the network model to the resource zone, the instructions are to cause the processor to:

determine a network model comprising a network role, a location and a function that matches a function of the network resource in the resource zone, and allocate the determined network model to the resource zone.

19. The non-transitory computer readable storage medium according to claim 15, wherein the instructions are to cause the processor to:

identify the network model, to which the service template applies;

locate the resource zone corresponding to the network model from the resource pool; and utilize the resource zone found in the resource pool for the service template.

* * * * *